(No Model.)

W. McGREGOR.
BALE TIE AND HOOK.

No. 579,892. Patented Mar. 30, 1897.

Witnesses
D. H. Blakelock
John P. Wilson

Inventor
William McGregor,
by Whitman & Wilkinson
Attorneys

THE NORRIS PETERS CO., PHOTO-LITHO., WASHINGTON, D. C.

UNITED STATES PATENT OFFICE.

WILLIAM McGREGOR, OF NEWBURG, NEW YORK, ASSIGNOR TO ALBERT H. F. SEEGER, OF SAME PLACE.

BALE TIE AND HOOK.

SPECIFICATION forming part of Letters Patent No. 579,892, dated March 30, 1897.

Application filed April 24, 1896. Serial No. 588,964. (No model.)

*To all whom it may concern:*

Be it known that I, WILLIAM McGREGOR, a citizen of the United States, residing at the city of Newburg, in the county of Orange and State of New York, have invented a new and useful Improvement in Bale Ties and Hooks, of which the following is a specification.

My invention relates to improvements in fastenings for bale-ties, and has for its object to provide a fastening which will enable the band or tie to be readily and effectually applied and which may be readily removed and used over and over again indefinitely.

My invention will be understood by reference to the accompanying drawings, wherein the same parts are indicated by the same letters throughout the several views.

Figure 1:
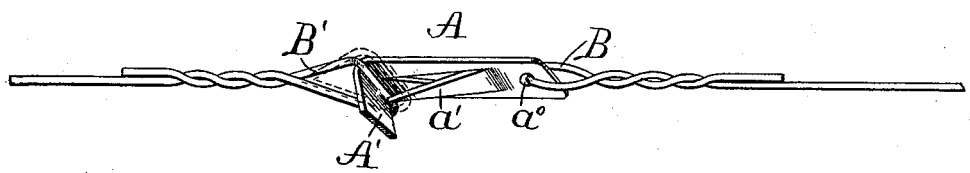
Figure 2:
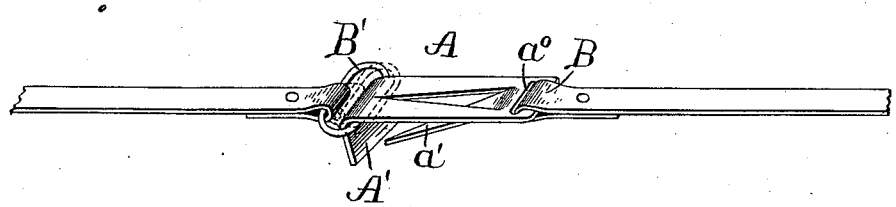
Figure 3:
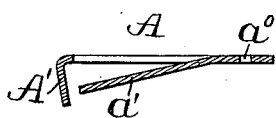
Figure 4:
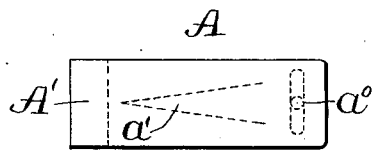

Figure 1 shows a perspective view of the improved hook or fastening attached to portions of a wire such as is used in baling hay. Fig. 2 is a similar view of the hook or fastening attached to portions of a metallic band such as is used in baling cotton. Fig. 3 is a central longitudinal section through the hook or fastening shown in Figs. 1 and 2; and Fig. 4 is a plan view of the flat plate or blank from which the said hook or fastening is made, the dotted lines across the end of said plate indicating the line where the same is bent to form the hook and the dotted lines in the center of said plate indicating where the tongue is stamped out of the said plate.

A represents the hook or fastening, and B and B' represent opposite ends of a wire or band, one end of which, as B, is attached to the said hook or fastening, while the other end, as B', is provided with a loop adapted to engage the bent-under end or hook proper of the fastening, as hereinafter described. This fastening A is made, preferably, from a flat metallic plate, such as shown in Fig. 4, the metal of the said plate having but little, if any, resilience. In one end of this flat plate is formed an opening or slot $a^0$, into which one end of the wire or band of the tie is secured, as shown in Figs. 1 and 2, and at the opposite end of the said plate a short portion thereof, A', is bent inward slightly past an angle of ninety degrees, forming a flat hook, as seen most clearly in Fig. 3. When in use, this hook is turned inward toward the material of the bale, and being made slanting, as shown, the tension on the tie after the looped end B' thereof has been caught under the said hook will cause the said loop B' to slide up to the bend of the said hook and there remain until from any cause the band or tie becomes slack, in which case the said loop may have a tendency to become disengaged, but for this contingency I provide in the following manner: A tongue $a'$, which is conveniently made V-shaped, as indicated by the dotted lines in Fig. 4, is stamped out of the body of the plate and bent away from the plate in the direction of the hook A' until its end or point is nearly as far from the body of the plate as the end of the hook A', and there is left between the end or point of this tongue and the inner face of the hook a space slightly greater than is absolutely necessary to allow the looped end of the tie to pass between the two. The relative positions of the tongue and hook are shown clearly in Fig. 3. Now when the tie becomes slack the loop B' thereof will move forward on the hook A', as shown in dotted lines in Figs. 1 and 2, and will engage behind the tongue $a'$, which latter will prevent its displacement, as will be obvious, but when it is desired to remove the tie from the bale while the same is taut it is simply necessary to insert a hook or other instrument under the fastener A and lift the same, when the hook A' will be drawn out of the loop B' and the tie will be released without injury, and may then be used again as many times as desired.

Having thus described my invention, what I claim, and desire to secure by Letters Patent of the United States, is—

The bale-tie fastening A, composed of a non-resilient metallic plate having an opening near one end for the attachment of a band or tie, and having its opposite end bent to form a short flat rigid hook A' having a slight backward inclination, and having a flat rigid tongue $a'$ stamped from the body of said plate and bent away therefrom in the direction of said hook, and having its point opposite the inner face of said hook a short distance therefrom, substantially as described.

WILLIAM McGREGOR.

Witnesses:
ADDISON C. ORMSBEE,
HENRY KOHL.